(12) United States Patent
Greywall

(10) Patent No.: US 7,099,063 B2
(45) Date of Patent: Aug. 29, 2006

(54) MEMS DEVICE FOR AN ADAPTIVE OPTICS MIRROR

(75) Inventor: Dennis S. Greywall, Whitehouse Station, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 39 days.

(21) Appl. No.: 10/796,618

(22) Filed: Mar. 9, 2004

(65) Prior Publication Data

US 2005/0200938 A1 Sep. 15, 2005

(51) Int. Cl.
*G02B 26/00* (2006.01)
(52) U.S. Cl. .................. 359/290; 359/245; 359/872
(58) Field of Classification Search ................ 359/290
See application file for complete search history.

(56) References Cited

U.S. PATENT DOCUMENTS

| | | | |
|---|---|---|---|
| 5,501,893 A | 3/1996 | Laermer et al. | 428/161 |
| 5,629,790 A | 5/1997 | Neukermans et al. | 359/198 |
| 5,745,278 A | 4/1998 | La Fiandra | 359/224 |
| 6,201,631 B1 | 3/2001 | Greywall | 359/245 |
| 6,283,601 B1 | 9/2001 | Hagelin et al. | 359/871 |
| 6,384,952 B1 | 5/2002 | Clark et al. | 359/224 |
| 6,497,141 B1 | 12/2002 | Turner et al. | 73/105 |
| 6,771,001 B1 | 8/2004 | Mao et al. | 310/309 |
| 6,838,738 B1* | 1/2005 | Costello et al. | 257/414 |
| 6,845,670 B1* | 1/2005 | McNeil et al. | 73/514.32 |
| 6,983,924 B1* | 1/2006 | Howell et al. | 251/118 |
| 2005/0120553 A1* | 6/2005 | Brown et al. | 29/884 |

* cited by examiner

*Primary Examiner*—Jordan Schwartz
*Assistant Examiner*—Jessica Stultz

(57) ABSTRACT

A MEMS device having a movable mirror pixel supported on a substrate and coupled to a motion actuator so as to enable rotation of the mirror pixel about an axis lying within the mirror plane. In one embodiment, the motion actuator has a movable electrode, on which the mirror pixel is mounted. The movable electrode is supported on the substrate by a pair of upright springs, each having two parallel segments joined at one end and disjoint at the other end. One disjoint segment end is coupled to the substrate, while the other disjoint segment end is coupled to the movable electrode. The end of the upright spring corresponding to the joined segment ends points away from the substrate such that (i) the spring body protrudes through a narrow slot in the mirror pixel and (ii) the mirror plane lies at about the mid-point of the spring.

24 Claims, 6 Drawing Sheets

MEMS DEVICE FOR AN ADAPTIVE OPTICS MIRROR

CROSS-REFERENCE TO RELATED APPLICATION

The subject matter of this application is related to that of U.S. patent application Ser. No. 10/772,847, filed Feb. 5, 2004, which is incorporated herein by reference.

BACKGROUND OF THE INVENTION

1. Field of the Invention

The present invention relates to adaptive optics and, more specifically, to micro-electromechanical systems (MEMS) for implementing adaptive optics.

2. Description of the Related Art

Adaptive optics is a field of optics dedicated to the improvement of optical signals using information about signal distortions introduced by the environment in which the optical signals propagate. An excellent introductory text on the subject is given in "Principles of Adaptive Optics" by R. K. Tyson, Academic Press, San Diego, 1991, the teachings of which are incorporated herein by reference.

A representative example of an adaptive optical element is a deformable mirror driven by a wavefront sensor and configured to compensate for atmospheric distortions that affect telescope images. Small naturally occurring variations in temperature (~1° C.) in the atmosphere cause random turbulent motion of the air and give rise to changes in the atmospheric density and, hence, to the index of refraction. The cumulative effect of these changes along the beam propagation path may lead to beam wandering, spreading, and intensity fluctuations, each of which degrades image quality. The wavefront sensor is a device that measures the distortions introduced in the atmosphere and generates feedback for the deformable mirror. Based on the feedback, the mirror is deformed such that the beam distortions are significantly reduced, thus improving the image quality.

One frequently used type of deformable mirror is a segmented mirror, in which each segment (pixel) can individually be translated and/or rotated. For many applications, a segmented mirror is required to have: (1) for each segment, translation/rotation magnitudes on the order of 1 μm/10 degrees, respectively, and (2) for the mirror as a whole, a fill factor of at least 98%. However, for many prior-art designs, these requirements are in direct conflict with each other and therefore difficult or even impossible to meet. For example, the high fill-factor requirement suggests a solution, in which mirror support elements and motion actuators are placed beneath (hidden under) the mirror. One result of this placement is that each segment typically rotates about an axis lying below the mirror surface and therefore is subjected to a lateral displacement within the mirror plane during rotation. To prevent physical interference with the neighboring mirror segments caused by this displacement, a relatively large spacing between the segments is required. The latter, however, significantly reduces the fill factor.

SUMMARY OF THE INVENTION

Problems in the prior art are addressed, in accordance with the principles of the present invention, by a MEMS device having a movable mirror pixel supported on a substrate and coupled to a motion actuator located between the mirror pixel and the substrate so as to enable rotation of the mirror pixel about an axis lying within the mirror plane.

In one embodiment of the invention, the motion actuator has a movable electrode, on which the mirror pixel is mounted. The movable electrode is supported on the substrate by a pair of upright springs, each having two parallel segments joined at one end of the spring and disjoint at the other end. One disjoint segment end is coupled to the substrate, while the other disjoint segment end is coupled to the movable electrode. The end of the upright spring corresponding to the joined segment ends points away from the substrate such that (i) the spring body protrudes through a narrow slot in the mirror pixel and (ii) the mirror plane lies at about the mid-point of the upright spring. Advantageously, a mirror pixel implemented in accordance with an embodiment of the invention has a relatively small lateral displacement during rotation while the mirror support structure takes up a relatively small surface area within the mirror plane. This enables implementation of a segmented mirror with tightly spaced mirror pixels providing a fill factor higher than about 98%.

In another embodiment of the invention, a MEMS device has an upright spring supported on a substrate. The upright spring has two segments joined at one end of the spring and disjoint at another end of the spring. The upright spring is positioned with respect to the substrate such that the joined segment ends are at a greater distance from the substrate than the disjoint segment ends. One disjoint segment end is coupled to the substrate and the other disjoint segment end is adapted to move with respect to the first one via a scissor-type motion.

DETAILED DESCRIPTION

Figure 1:
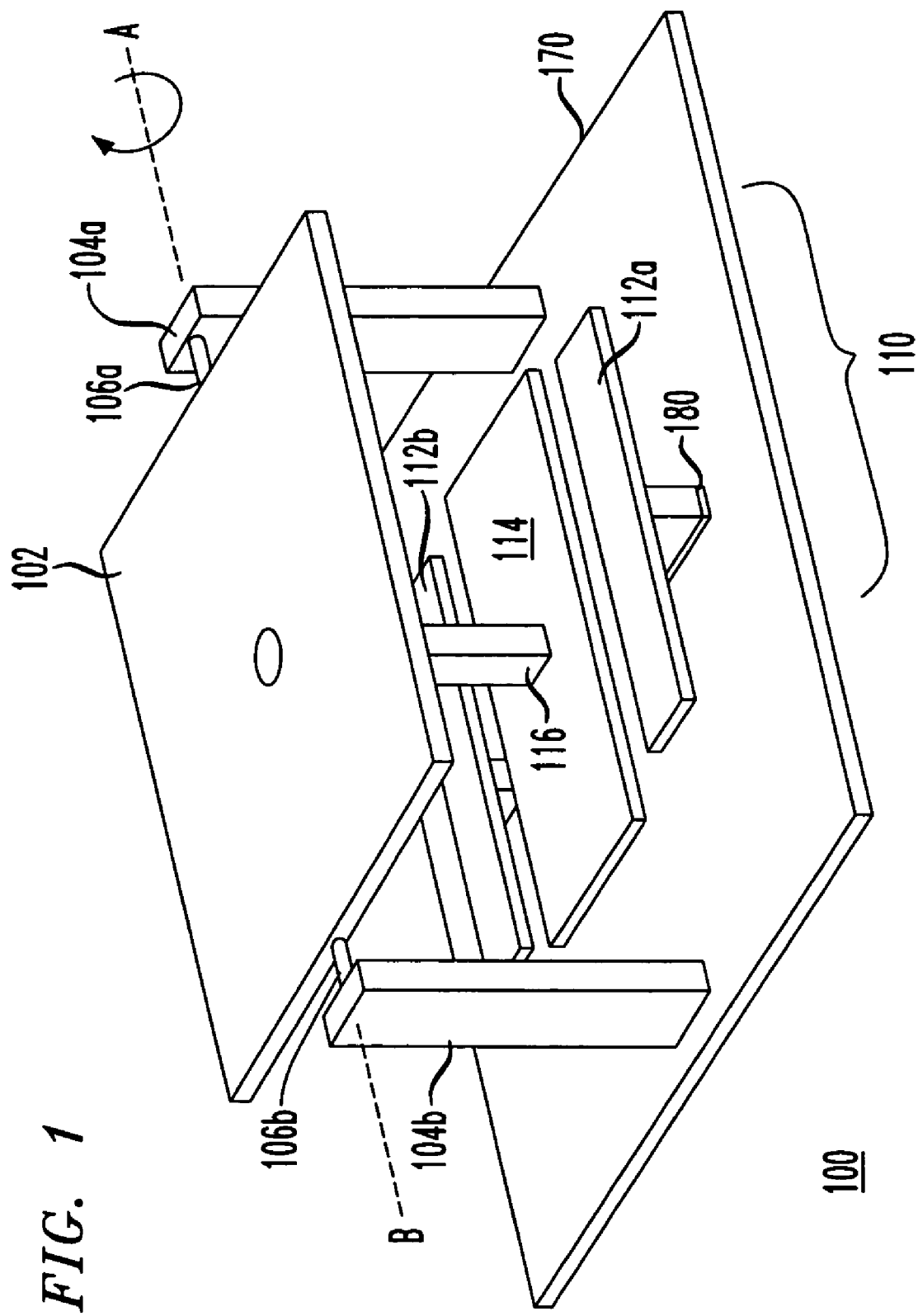
FIG. 1 shows a three-dimensional perspective view of a MEMS device according to one embodiment of the invention.

FIG. 1 shows a three-dimensional perspective view of an exemplary MEMS device 100 arranged in accordance with the principles of the invention, which may be used to implement a pixel of an adaptive optics mirror. Device 100 has a movable plate 102 and connected to a motion actuator 110. Plate 102 is supported by a pair of torsion rods 106a–b, each connected between the plate and one of posts 104a–b attached to a substrate 170. Rods 106a–b define an axis of rotation for plate 102 shown by the dashed line and labeled AB in FIG. 1.

Actuator 110 is a fringe-field actuator made up of two lateral electrodes 112a–b and an intermediate electrode 114. Lateral electrodes 112a–b are attached to substrate 170 and, as such, are stationary. In contrast, intermediate electrode 114 is attached to plate 102 by a link rod 116 and, as such, is movable, together with the plate, with respect to substrate 170. When intermediate electrode 114 is moved toward one of lateral electrodes 112, link rod 116 transfers motion of the intermediate electrode to plate 102, thereby rotating the plate about axis AB.

Each lateral electrode 112 is electrically isolated from substrate 170 by an insulation layer 180 and can be electrically biased with respect to the substrate. In contrast, intermediate electrode 114 is in electrical contact with substrate 170 via link rod 116, plate 102, torsion rods 106, and posts 104. Therefore, electrodes 112 and 114 can be electrically biased with respect to each other to impart motion to plate 102. For example, when lateral electrode 112a is biased with respect to intermediate electrode 114 while lateral electrode 112b is not biased, the intermediate electrode is pulled toward the biased electrode, which rotates plate 102 in the corresponding direction. Plate 102 comes to rest, when spring deformation forces of torsion rods 106 balance the electrostatic attraction force between the electrodes. When the bias is removed, the spring forces return plate 102 and intermediate electrode 114 into the initial position. Similarly, when lateral electrode 112b is biased with respect to intermediate electrode 114 while lateral electrode 112a is not biased, plate 102 rotates in the opposite direction.

Figure 2A:
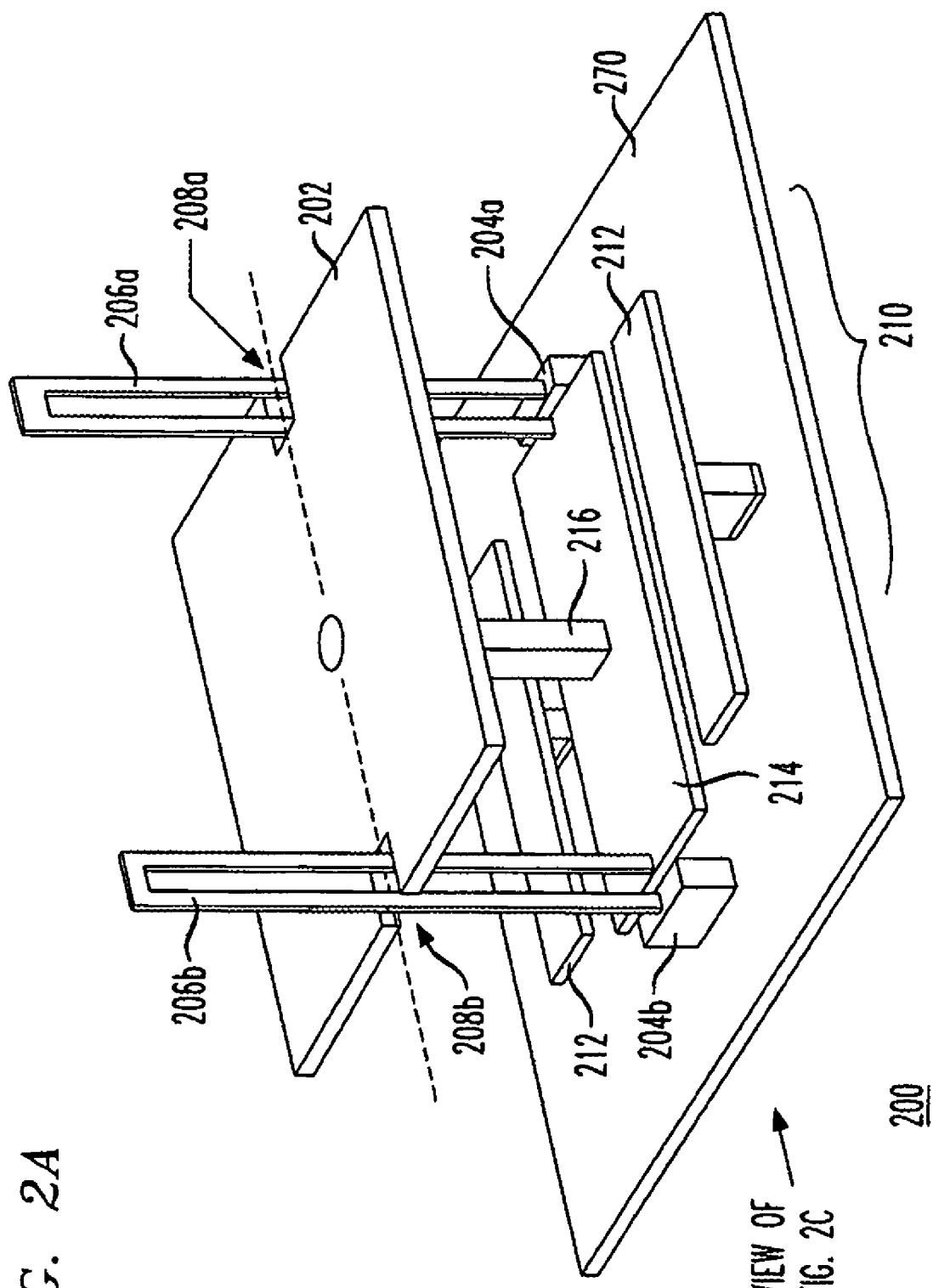
FIGS. 2A–C show a MEMS device according to another embodiment of the invention.
Figure 2B:
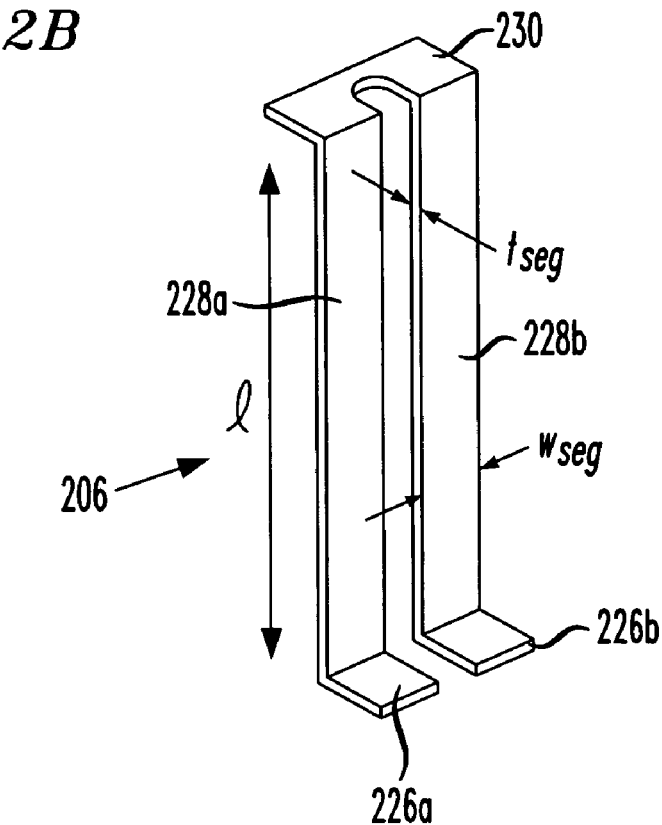
Figure 2C:
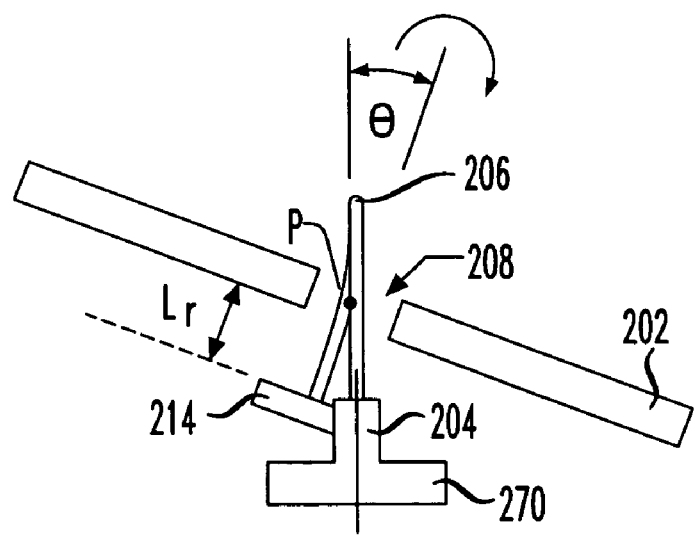

FIGS. 2A–C show another embodiment of the invention. More specifically, FIG. 2A shows a three-dimensional perspective view of a MEMS device 200; FIG. 2B shows a three-dimensional perspective view of a spring 206 utilized in device 200; and FIG. 2C is a side view of device 200 illustrating possible plate rotation.

Referring to FIG. 2A, device 200 is similar to device 100 of FIG. 1 and may similarly be used to implement a pixel of an adaptive optics mirror. Device 200 has a movable plate 202 supported on a substrate 270 and connected to a motion actuator 210 that is similar to actuator 110 of device 100. However, instead of torsion rods 106a–b of device 100, device 200 employs upright springs 206a–b, one of which is shown in more detail in FIG. 2B. Referring now to both FIGS. 2A and 2B, each upright spring 206 has two feet 226a–b, one of which is connected to a corresponding one of support posts 204a–b and the other is connected to an intermediate electrode 214 of actuator 210. Each upright spring 206 has two spring segments 228a–b that protrude through a slot (opening) 208 in plate 202 as shown in FIG. 2C without attaching to the plate. Spring segments 228a–b are joined at the top of upright spring 206 by a bridge 230. In a preferred implementation, the width and thickness ($W_{seg}$ and $t_{seg}$) of segments 228 are such that upright spring 206 resists compression along the direction orthogonal to the plane of substrate 270 (i.e., has high longitudinal stiffness) while it permits a relatively easy spring deformation of the "scissor" type shown in FIG. 2C.

Referring now to FIG. 2C, when intermediate electrode 214 is displaced from its unbiased position shown in FIG. 2A, one foot of upright spring 206 moves together with the intermediate electrode while the other foot, being rigidly attached to post 204, remains stationary. It can be shown that, due to the longitudinal stiffness of upright spring 206, motion of any structure attached to the movable foot of the spring is very closely approximated by a simple rotation about an axis passing through the mid-point (i.e., at half-length) of the spring, which point is labeled P in FIG. 2C. Therefore, when link rod 216 has a length $L_r$ equal to about half the length of upright spring 206, plate 202 rotates about an axis lying within the plane of plate 202 similar to that for plate 102 in device 100 (FIG. 1). In certain implementations of device 200, the surface area within the plane of plate 202 taken up by slots 208 can be made significantly smaller than the corresponding area within the plane of plate 102 taken up by posts 104 and torsion rods 106 in device 100. This increases the fill factor of device 200 compared to that of device 100.

Figure 3:
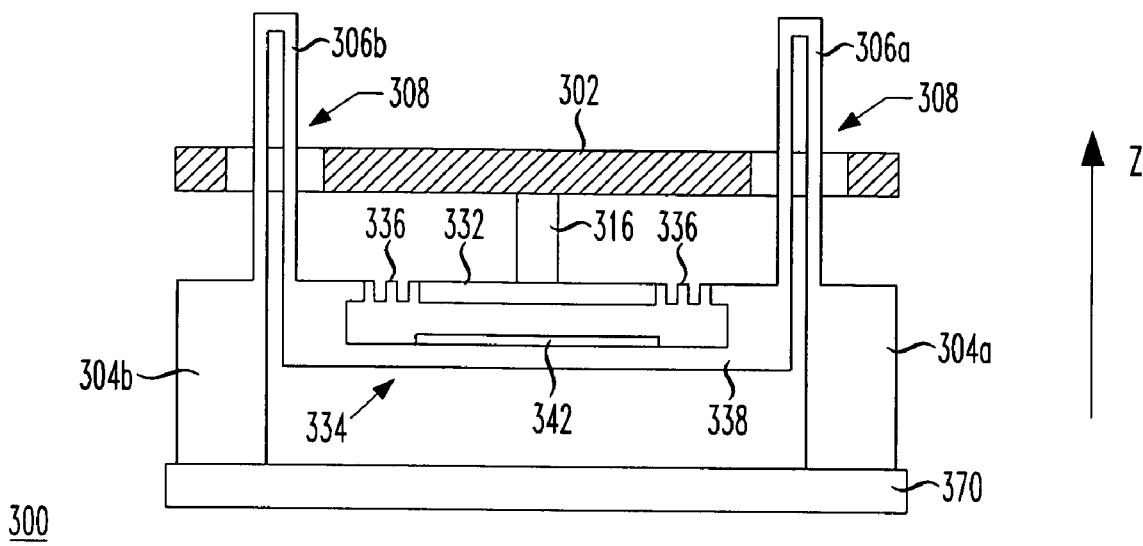
FIG. 3 shows a cross-sectional view of a MEMS device according to yet another embodiment of the invention.

FIG. 3 shows a cross-sectional view of a MEMS device 300 according to yet another embodiment of the invention. Device 300 is similar to device 200 (FIG. 2) with similar structural elements of the two devices marked with labels having the same last two digits. However, one difference between devices 300 and 200 is that, instead of intermediate electrode 214, device 300 has a cradle structure 334. Similar to electrode 214 (FIG. 2), cradle structure 334 can move as a whole, when upright springs 306a–b are deformed, thereby enabling rotation of plate 302 with respect to substrate 370. But in addition to rotation with respect to substrate 370, cradle structure 334 enables piston motion of plate 302 along axis Z with respect to the cradle structure.

Cradle structure 334 has a movable plate 332, on which plate 302 is mounted using link rod 316. Plate 332 is suspended above a cradle base 338 with a pair of serpentine springs 316 that allow for out-of-plane displacements of plate 332. An actuating electrode 342 attached to cradle base 338 beneath plate 332 forms, together with that plate, a parallel plate actuator that can be used to translate plate 302. For example, when electrode 342 is biased with respect to plate 332, it generates an attractive electrostatic force, which pulls plate 332 toward the electrode, thereby translating plate 302 with respect to cradle structure 334. When the bias is removed, springs 336 return plates 332 and 302 into their initial positions.

Figure 4:
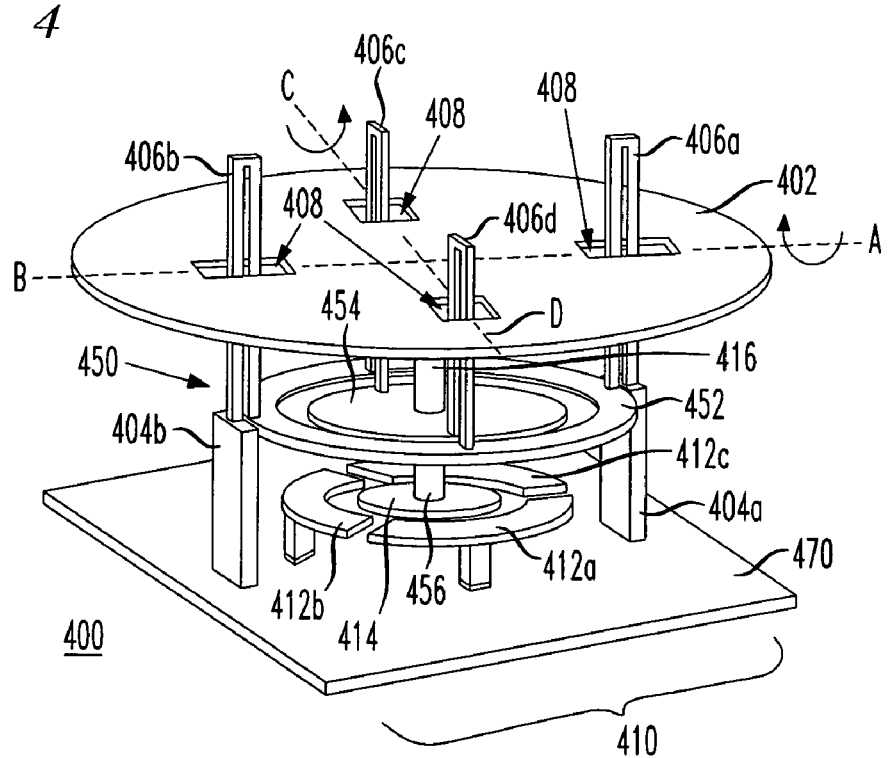
FIG. 4 shows a three-dimensional perspective view of a MEMS device according to yet another embodiment of the invention.

FIG. 4 shows a three-dimensional perspective view of a MEMS device 400 according to yet another embodiment of the invention. Similar to device 200 of FIG. 2, device 400 implements rotation of a movable plate about an axis lying within the plane of that plate. However, in contrast to device 200, where the movable plate rotates about a single axis, the movable plate in device 400 can rotate about two different axes, thereby providing a capability for tilting the plate in any desired direction.

Device 400 has a movable plate 402 supported on a substrate 470 and connected to a motion actuator 410. Plate 402 is mounted using a link rod 416 on a gimbal structure 450 having an outer ring 452 and an inner disk 454. Outer ring 452 is supported by a pair of upright springs 406a–b, each attached between the outer ring and one of posts 404a–b attached to substrate 470. Inner disk 454 is supported by another pair of upright springs 406c–d, each attached between the inner disk and outer ring 452. Each of upright springs 406a–d is similar to upright spring 206 shown in FIG. 2B and protrudes through a corresponding slot 408 in plate 402. In a preferred implementation, the length of link rod 416 is about half the length of spring 406, which puts the axes of rotation defined by springs 406a–b (axis AB in FIG. 4) and springs 406c–d (axis CD in FIG. 4) within the plane of plate 402. Although, in the embodiment of FIG. 4, axes AB and CD are mutually orthogonal, other axis orientations may also be used.

Actuator 410 is a fringe-field actuator comprising three lateral electrodes 412a–c and an intermediate electrode 414. Each lateral electrode 412 is similar to, e.g., lateral electrode 212 of FIG. 2A, while intermediate electrode 414 is similar to intermediate electrode 214 of FIG. 2A. When intermediate electrode 414 is deflected from its initial position toward lateral electrodes 412, a link rod 456 transfers motion of the intermediate electrode to inner disk 454 of gimbal structure 450, thereby rotating the disk as further described below.

Direction, in which intermediate electrode 414 is deflected, is determined by voltages applied to lateral electrodes 412a–c. In general, intermediate electrode 414 can be deflected in any chosen direction by applying an appropriate combination of bias voltages. For example, suppose that the plane orthogonal to substrate 470 and passing through axis AB is a plane of symmetry for lateral electrode 412b. Then, when lateral electrode 412b is biased with respect to intermediate electrode 414, while the other lateral electrodes 412a and 412c are not biased, the intermediate electrode is pulled toward electrode 412b along the projection of axis AB onto substrate 470. This rotates disk 454 and therefore plate 402 about axis CD. Similarly, when electrodes 412a–c are biased such that intermediate electrode 414 is pulled along the projection of axis CD, disk 454 and plate 402 rotate about axis AB. One skilled in the art will appreciate that deflection of intermediate electrode 414 in an arbitrary direction will generally produce rotation of disk 454 and plate 402 about both axis AB and axis CD.

Different fabrication techniques may be used to fabricate devices of the present invention. In one embodiment, a fabrication process similar to that disclosed in the above-referenced U.S. patent application Ser. No. 10/772,847 may be used. Briefly, the fabrication process begins with a silicon-on-insulator (SOI) wafer and proceeds with a sequence of patterning, etching, and deposition steps known to one skilled in the art. The patterning steps are carried out using lithography. The etching steps are carried out using material-specific etching, e.g., reactive ion etching (RIE) for various silicon layers and fluorine-based etching for various silicon oxide layers. The deposition steps are carried out using, e.g., chemical vapor deposition. Additional description of various fabrication steps may be found in U.S. Pat. Nos. 6,201,631, 5,629,790, and 5,501,893, the teachings of which are incorporated herein by reference.

U.S. patent application Ser. No. 10/772,847 also discloses fabrication of flexible vertical beams that are similar to upright springs in certain embodiments of the present invention (e.g., springs 206 of FIG. 2) in that both structure types extend substantially perpendicular to the plane of the substrate. However, an upright spring protrudes through the corresponding movable plate while a flexible vertical beam is confined to the space between the movable plate and the substrate. In view of this difference, fabrication steps related to the realization of the protrusion feature of upright springs are described in more detail below.

Figure 5A:
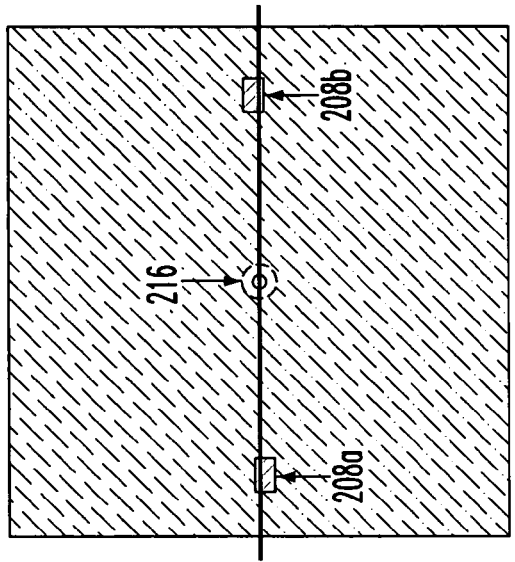
FIGS. 5A–F illustrate representative fabrication steps of the device shown in FIG. 2 according to one embodiment of the invention.
Figure 5B:
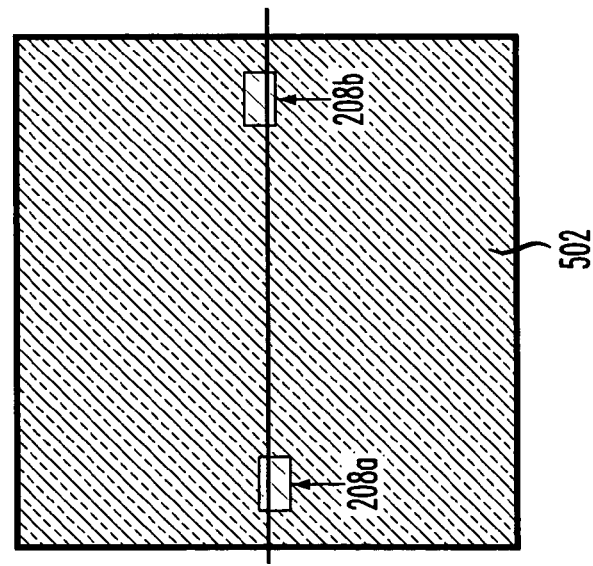
Figure 5C:
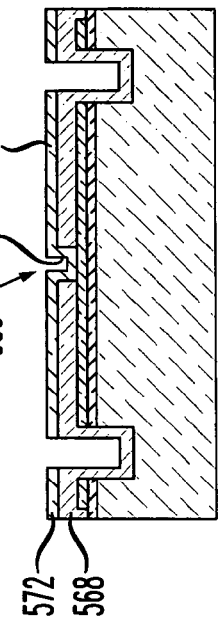
Figure 5D:
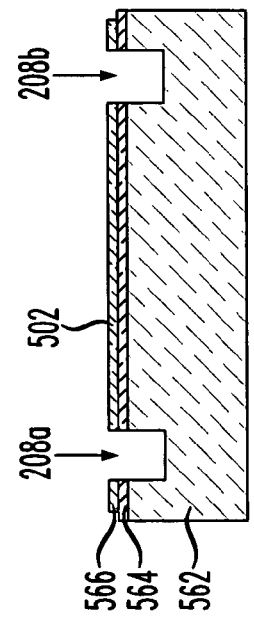
Figure 5E:
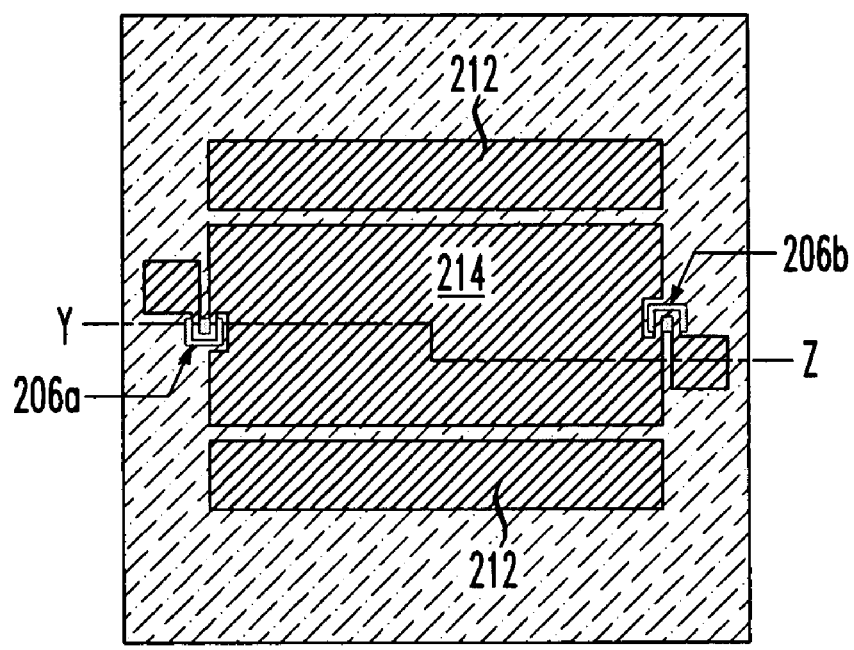
Figure 5F:
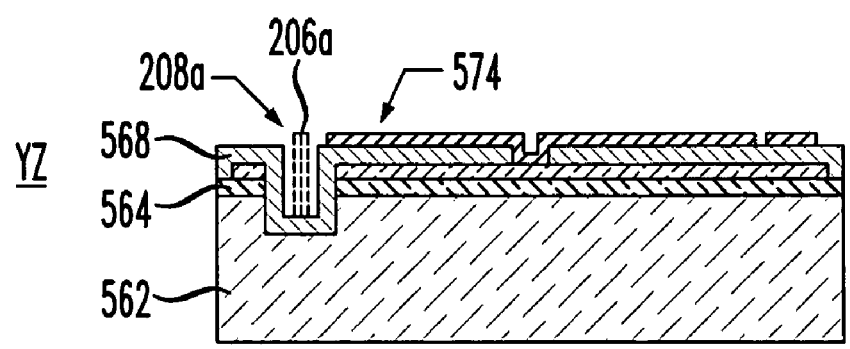

FIGS. 5A–F schematically illustrate representative fabrication steps of device 200 according to one embodiment of the invention. More specifically, FIGS. 5A, 5C, and 5E show top views of device 200 during those fabrication steps, whereas FIGS. 5B, 5D, and 5F show the corresponding cross-sectional side views of the device.

Referring to FIGS. 5A–B, in one embodiment, fabrication of device 500 begins with a silicon-on-insulator (SOI) wafer having (i) two silicon layers, i.e., a handle layer 562 and an overlayer 566, and (ii) a silicon oxide layer 564 located between overlayer 566 and handle layer 562. Plate 502 is defined in overlayer 566 using reactive etching, which stops at the silicon oxide layer. Openings 208a–b (see also FIG. 2) are created by etching away the corresponding portions of overlayer 566 and silicon oxide layer 564. Then a timed etch is applied to handle layer 562 to create wells having a depth corresponding to the length of future upright springs 206, by which length the springs extend above plate 202 (see FIG. 2).

Referring to FIGS. 5C–D, first, a relatively thick (e.g., 5 μm) silicon oxide layer 568 is deposited over the structure of FIGS. 5A–B. Second, layer 568 is patterned and etched to form an opening 580 for link rod 216 connecting plate 202 and intermediate electrode 214. Then, a thin (e.g., 1 μm) poly-silicon layer 572 is deposited over layer 568. The part of layer 572 that fills opening 580 creates link rod 216.

Finally, layer 572 is patterned and etched to remove poly-silicon from the wells corresponding to openings 208.

Referring to FIGS. 5E–F, first, a thin (e.g., 0.5 μm) poly-silicon layer 574 is deposited over the structure of FIGS. 5C–D. This layer covers all exposed surfaces of that structure including the vertical walls of the wells corresponding to openings 208. Then, the composite silicon layer comprising layers 572 and 574 is patterned and etched to form intermediate electrode 214, lateral electrodes 212, and upright springs 206. In particular, bridge 230 of upright spring 206 (see FIG. 2B) is formed from the portion of layer 574 located at the bottom of the corresponding well; spring segments 228a–b of upright spring 206 (see FIG. 2B) are formed from the portion of layer 574 located at one of the vertical walls of the well, and two feet 226a–b of upright spring 206 are formed from the portion of layer 574 deposited near the top circumference of the well. Note that silicon oxide layer 568 prevents upright springs 206 from making contact with plate 302.

Further fabrication steps are straightforward and proceed to form support posts 204a–b and substrate 270 over the structure of FIGS. 5E–F (see also FIG. 2). The final structure of device 200 is released by removing (e.g., etching away) all oxide layers. Note that handle (silicon) layer 562 will fully detach from the final structure once silicon oxide layers 564 and 568 are removed. Also note that the views shown in FIGS. 5B, 5D, and 5F are inversed (flipped) with respect to the view shown in FIG. 2A.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although fabrication of MEMS devices of the invention has been described in the context of using silicon/silicon oxide SOI wafers, other suitable materials, such as germanium-compensated silicon, may similarly be used. The materials may be appropriately doped as known in the art. Various surfaces may be modified, e.g., by metal deposition for enhanced reflectivity and/or electrical conductivity or by ion implantation for enhanced mechanical strength. Differently shaped plates, springs, segments, rods, posts, actuators, electrodes, and/or other device elements/structures may be implemented without departing from the scope and principle of the invention. Springs may have different shapes and sizes, where the term "spring" refers in general to any suitable elastic structure that can recover its original shape after being distorted. Spring segments of an upright spring may or may not be parallel to each other. An opening in a mirror segment (e.g., slot 208 in FIG. 2) may or may not be fully surrounded by said mirror segment. Alternatively, a mirror segment may be shaped such that an upright spring passes outside the perimeter of said mirror segment. The length of a link rod (e.g., link rod 216 in FIG. 2) may be chosen such that the axis of rotation for the corresponding mirror segment is not within the plane of that segment. Various MEMS devices of the invention may be arrayed as necessary and/or apparent to a person skilled in the art.

I claim:

1. A MEMS device, comprising:
   a rotatable mass suspended at a first offset distance from a substrate, wherein the rotatable mass is a part of a motion actuator adapted to move said mass with respect to the substrate; and an upright spring coupled between the rotatable mass and the substrate, wherein the upright spring and the motion actuator enable rotation of said mass about a rotation axis offset from the substrate by a distance greater than the first offset distance.

2. The device of claim 1, wherein the upright spring extends from the substrate beyond the rotatable mass.

3. The device of claim 1, wherein the upright spring comprises two segments joined at one end of the spring and disjoint at another end of the spring, wherein:
one disjoint segment end is coupled to the rotatable mass and the other disjoint segment end is coupled to the substrate; and
the end of the spring having the joined segments is an unattached end.

4. The device of claim 3, wherein the upright spring is adapted to spread the disjoint segment ends via a scissor-type motion.

5. The device of claim 1, further comprising a structure mounted on the rotatable mass and positioned at a second offset distance from the substrate greater than the first offset distance, wherein the structure is mechanically connected to move together with the rotatable mass.

6. The device of claim 5, wherein the upright spring extends from the substrate beyond the structure.

7. The device of claim 6, wherein the upright spring protrudes through an opening in the structure.

8. The device of claim 5, wherein the structure is a plate and the rotation axis lies within a plane of the plate.

9. The device of claim 5, wherein the rotatable mass and the structure comprise two parallel plates connected by a link rod.

10. The device of claim 5, wherein the structure is a pixel of a segmented mirror.

11. The device of claim 1, comprising a pair of upright springs, said pair defining the rotation axis.

12. The device of claim 1, wherein the motion actuator is a fringe-field actuator.

13. The device of claim 1, wherein the rotatable mass is a movable electrode of the motion actuator and the motion actuator further comprises one or more stationary electrodes coupled to the substrate.

14. The device of claim 1, wherein the rotatable mass comprises an outer sub-structure and an inner sub-structure, wherein the inner sub-structure is adapted to move with respect to the outer sub-structure and the outer sub-structure is adapted to move with respect to the substrate.

15. The device of claim 14, comprising two pairs of upright springs, wherein each spring of one pair is coupled between the substrate and the outer sub-structure and each spring of the other pair is coupled between the outer sub-structure and the inner sub-structure.

16. The device of claim 1, wherein the rotatable mass comprises a base and a sub-structure movably coupled to the base.

17. The device of claim 16, wherein the rotatable mass comprises a motion actuator adapted to translate the sub-structure with respect to the base.

18. The device of claim 17, wherein the motion actuator is a parallel plate actuator.

19. A MEMS device, comprising an upright spring supported on a substrate and a rotatable mass suspended at a first offset distance from a substrate, wherein:
the upright spring comprises two segments joined at one end of the spring and disjoint at another end of the spring;
one disjoint segment end is coupled to the substrate and the other disjoint segment end is adapted to move with respect to the substrate;
the end of the spring having the joined segments is an unattached end;
the disjoint segment end adapted to move with respect to the substrate is connected to the rotatable mass; and
the upright spring enables rotation of the rotatable mass about a rotation axis offset from the substrate by a distance greater than the first offset distance.

20. The device of claim 19, wherein the upright spring is positioned with respect to the substrate such that the joined segment ends are at a greater distance from the substrate than the disjoint segment ends.

21. The device of claim 19, wherein the upright spring is adapted to spread the disjoint segment ends via a scissor-type motion.

22. The device of claim 19, further comprising a structure mounted on the rotatable mass and positioned at a second offset distance from the substrate greater than the first offset distance, wherein the upright spring extends from the substrate beyond said structure.

23. A MEMS device, comprising:
a rotatable mass suspended at a first offset distance from a substrate, wherein the rotatable mass comprises an outer sub-structure and an inner sub-structure, wherein the inner sub-structure is adapted to move with respect to the outer sub-structure and the outer sub-structure is adapted to move with respect to the substrate; and
an upright spring coupled between the rotatable mass and the substrate, wherein the upright spring enables rotation of said mass about a rotation axis offset from the substrate by a distance greater than the first offset distance.

24. The device of claim 23, comprising two pairs of upright springs, wherein each spring of one pair is coupled between the substrate and the outer sub-structure and each spring of the other pair is coupled between the outer sub-structure and the inner sub-structure.

* * * * *